United States Patent
Byers et al.

(10) Patent No.: US 10,017,256 B2
(45) Date of Patent: Jul. 10, 2018

(54) ARMREST PIVOT GUARD

(71) Applicant: B/E Aerospace, Inc., Wellington, FL (US)

(72) Inventors: Zackery Rees Byers, Pfafftown, NC (US); James R. Penley, Pfafftown, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 107 days.

(21) Appl. No.: 15/169,970

(22) Filed: Jun. 1, 2016

(65) Prior Publication Data

US 2016/0347455 A1 Dec. 1, 2016

Related U.S. Application Data

(60) Provisional application No. 62/169,075, filed on Jun. 1, 2015.

(51) Int. Cl.
  *B64D 11/06* (2006.01)
  *B60N 2/75* (2018.01)

(52) U.S. Cl.
  CPC ............ *B64D 11/0644* (2014.12); *B60N 2/75* (2018.02); *B64D 11/06* (2013.01); *B64D 11/0646* (2014.12)

(58) Field of Classification Search
  None
  See application file for complete search history.

(56) References Cited

U.S. PATENT DOCUMENTS

| 4,938,534 | A  | * | 7/1990  | Tornero  | A47C 7/543 297/115    |
|-----------|----|---|---------|----------|-----------------------|
| 6,776,455 | B2 | * | 8/2004  | Longtin  | B64D 11/06 297/217.3  |
| 9,925,895 | B2 | * | 3/2018  | Ellis    | B64D 11/06            |
| 2003/0122392 | A1 | * | 7/2003  | Larsen   | B60N 3/10 296/24.34   |
| 2008/0041282 | A1 | * | 2/2008  | Goschy   | A61G 5/10 108/141     |
| 2011/0272991 | A1 | * | 11/2011 | Saxton   | B64D 11/06 297/411.46 |
| 2014/0333100 | A1 | * | 11/2014 | Wilkens  | B64D 11/0644 297/163  |
| 2016/0304011 | A1 | * | 10/2016 | Ellis    | B64D 11/06            |
| 2016/0376008 | A1 | * | 12/2016 | Kuyper   | A47B 5/006 244/122 R  |
| 2017/0088267 | A1 | * | 3/2017  | Dowty    | B64D 11/00153         |
| 2017/0088268 | A1 | * | 3/2017  | Kinard   | B64D 11/0638          |
| 2017/0215592 | A1 | * | 8/2017  | Cummins  | A47C 7/543            |

* cited by examiner

*Primary Examiner* — David E Allred
(74) *Attorney, Agent, or Firm* — Clements Bernard Walker PLLC

(57) ABSTRACT

An armrest assembly for a seat including a static frame member, an armrest pivotally attached at one end to the static frame member, and an armrest pivot guard pivotally attached at one end to the armrest or the static frame member. The armrest pivot guard moves with armrest motion to conceal and/or maintain coverage of a pinch point near an attachment point of the armrest to the static frame member.

10 Claims, 5 Drawing Sheets

ARMREST PIVOT GUARD

CROSS-REFERENCE TO RELATED APPLICATION

This application claims priority from U.S. Application No. 62/169,075 filed Jun. 1, 2015, the entirety of which is incorporated herein by reference.

TECHNICAL FIELD AND BACKGROUND OF THE INVENTION

The present invention relates generally to the field of pivoting armrests associated with passenger seats, and more particularly, to an articulating guard configured to move along with a pivoting armrest to conceal and cover potential pinch points.

Aircraft passenger seats and other seat types commonly include armrests for comfortably supporting the elbows, forearms, wrists and hands of a seat occupant. Armrests associated with certain seat types can be pivotally attached at one end to a static frame member, for example a seat spreader, such that the armrest can be moved between a stowed position vertically-oriented alongside the seatback and a deployed position horizontally-oriented laterally adjacent the seat bottom. Armrests can be selectively deployed during flight for comfort and to separate the seat bottoms of laterally adjacent seats, and can be stowed to facilitate seat egress.

Moving parts that pivot relative to static parts inevitably include pinch points and shear hazards near the point of attachment. In the case of armrests including decorative coverings shrouding the pivot point and frame members, pinch points can be found near the attachment end of the armrest both above and below the pivot point. One such hinge point pinch hazard can be located on the underside of the armrest between the covering and static frame member in the space therebetween necessary to allow complete armrest travel. Fingers and objects introduced into this open space during armrest movement can be injured and impede armrest movement. Therefore, it is necessary to conceal such open spaces at all times regardless of the armrest position.

BRIEF SUMMARY OF THE INVENTION

It is one object of the invention to provide an armrest assembly having concealed pinch points such that objects do not impede movement and/or are pinched as the armrest moves.

It is another object of the invention to provide an armrest assembly having pinch point covers driven by armrest movement such that pinch points near the attachment point of the armrest remain covered or concealed throughout the range of motion of the armrest.

It is yet another object of the invention to provide a pivoting armrest having concealed pinch points at the armrest attachment point.

To achieve the foregoing and other objects and advantages, in a first embodiment the present invention provides an armrest assembly including a static frame member associated with a seat, an armrest pivotally attached at one end to the static frame member, and an armrest pivot guard pivotally attached at one end to the armrest or the static frame member, the armrest pivot guard configured to move relative to the static frame member as the armrest pivots relative to the static frame member to maintain coverage of a pinch point near an attachment point of the armrest to the static frame member.

In a further embodiment, motion of the armrest pivot guard may be driven by armrest travel.

In a further embodiment, the armrest pivot guard may include a first component pivotally attached to the static frame member and a second component pivotally attached to the first component, and wherein the second component moves relative to the first component as the armrest pivots relative to the static frame member.

In a further embodiment, the assembly may include a spring disposed between the first component and the static frame member arranged to bias the first component in a direction away from the fixed frame member.

In a further embodiment, an attachment point of the first component to the static frame member may be positioned forward of the attachment point of the armrest to the static frame member.

In a further embodiment, the second component may directly contact the first component at a predetermined point along pivoting range of motion of the second component relative to the first component to prevent over-travel of the second component relative to the first component.

In a further embodiment, the armrest pivot guard may include an angled member pivotally attached to the armrest and having a free end arranged to travel along a surface of the static frame member as the armrest pivots relative to the static frame member.

In a further embodiment, the armrest pivot guard may include separate first and second components, wherein the first component is pivotally attached at one end to the static frame member and the second component is pivotally attached at one end to the armrest such that each of the first and second components move relative to the static frame member as the armrest pivots relative to the static frame member.

In a further embodiment, a free end of the second component may slide over and passed the first component as the armrest moves between fully vertical and fully horizontal orientations such that the second component covers open space between the armrest and the static frame member when the armrest is fully horizontal and the first and second components together cover open space between the armrest and the static frame member when the armrest is fully vertical.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
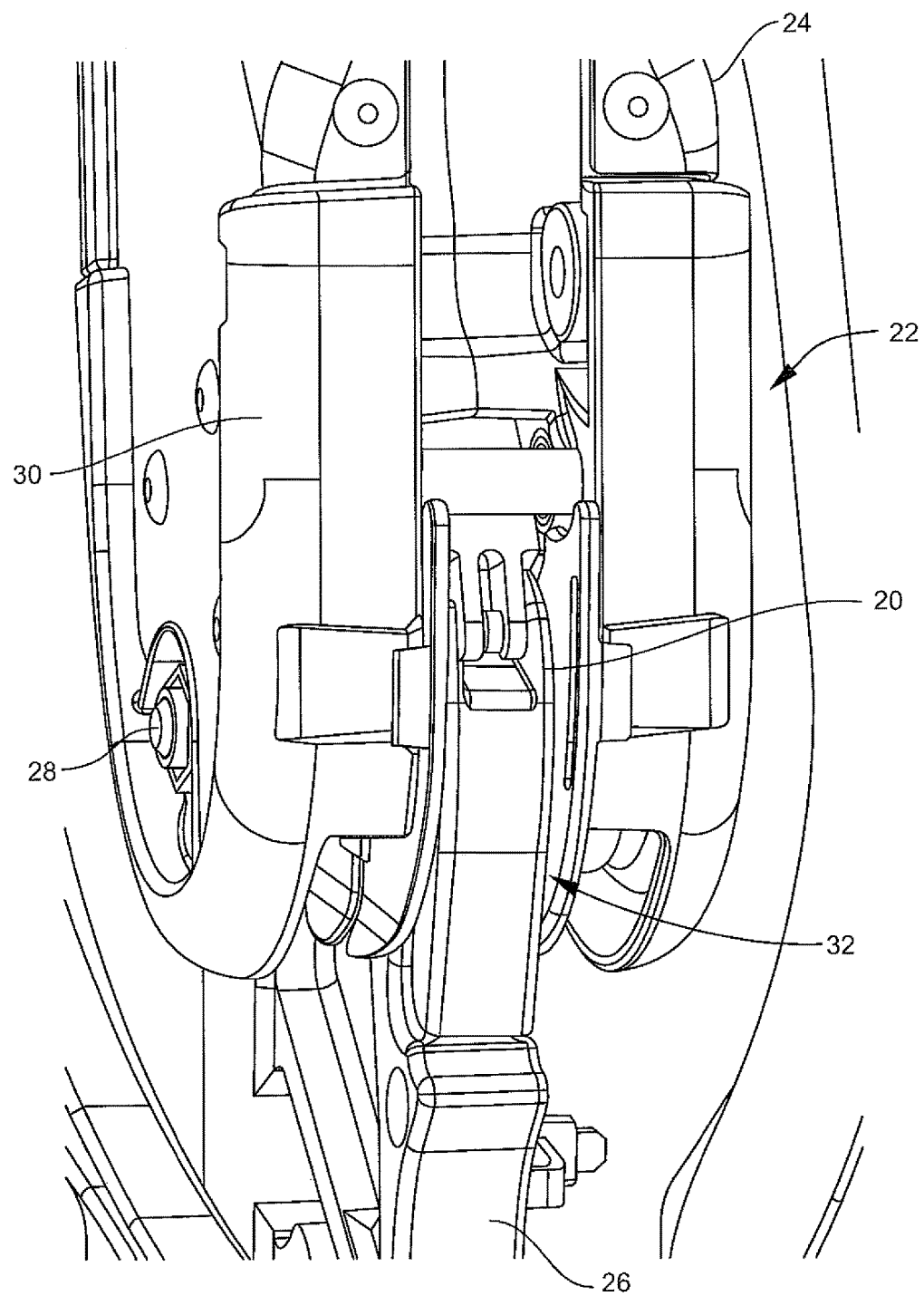
FIG. 1 is a detailed view of the underside of an armrest attachment point to a static frame member illustrating an armrest pivot guard according to a first embodiment of the invention.

FIG. 1 shows an armrest pivot guard 20 according to a first embodiment of the invention. Armrest pivot guard 20 generally functions to prevent the unwanted intrusion of objects and articles during armrest articulation or movement. Armrest pivot guard 20 is part of an armrest assembly 22 generally including an armrest 24 pivotally attached at one end to a static frame member 26. As shown, the static frame member 26 may be a seat spreader which is part of a passenger seat assembly. The seat spreader may be positioned to one side of a seat or between laterally adjacent seats. The seat spreader may be a primary frame component of a seat that functions to support at least one of the seat bottom, pivoting seat back, and seat legs. The static frame member 26 may be another type of frame member such as a transverse beam or component associated therewith. Regardless of the type of static frame member 26 and functionality thereof, the static frame member 26 as it concerns the present invention serves as an attachment point for the armrest 24.

The armrest 24 is generally configured to move, i.e., pivot, between a vertical orientation alongside the seat back and a horizontal orientation laterally-adjacent and/or elevated above the seat bottom. As such, the armrest 24 can be stowed vertically to facilitate seat egress and/or connect laterally adjacent seats, and can be deployed horizontally for comfort and/or to separate laterally adjacent seat bottoms. The armrest 24 can have a padded top and can serve to house seat controls, audio/video equipment and connections, etc. The armrest 24 may be shared between laterally-adjacent seats or may serve a single seat in the case of aisle and window seats.

The armrest 24 pivotally attaches to the static frame member 26 at pivot point 28 such that armrest pivots about 90 degrees between the fully stowed and fully deployed positions thereof. The armrest 24 is equipped with the armrest pivot guard 20 to prevent the intrusion of articles and objects into the open space between the armrest 24, or shrouding 30 thereof, and the static frame member 26 as the armrest 24 moves. The shrouding 30 can include multi-component decorative coverings that secure together to shroud the underlying structural members of the armrest and conceal the pivot point 28. Open space 32 provided between the shrouding 30 and static frame member 26 provides clearance to allow complete armrest movement. The open space 32, unoccupied in the prior art, is now occupied by the armrest pivot guard embodiments of the present invention.

Figure 2:
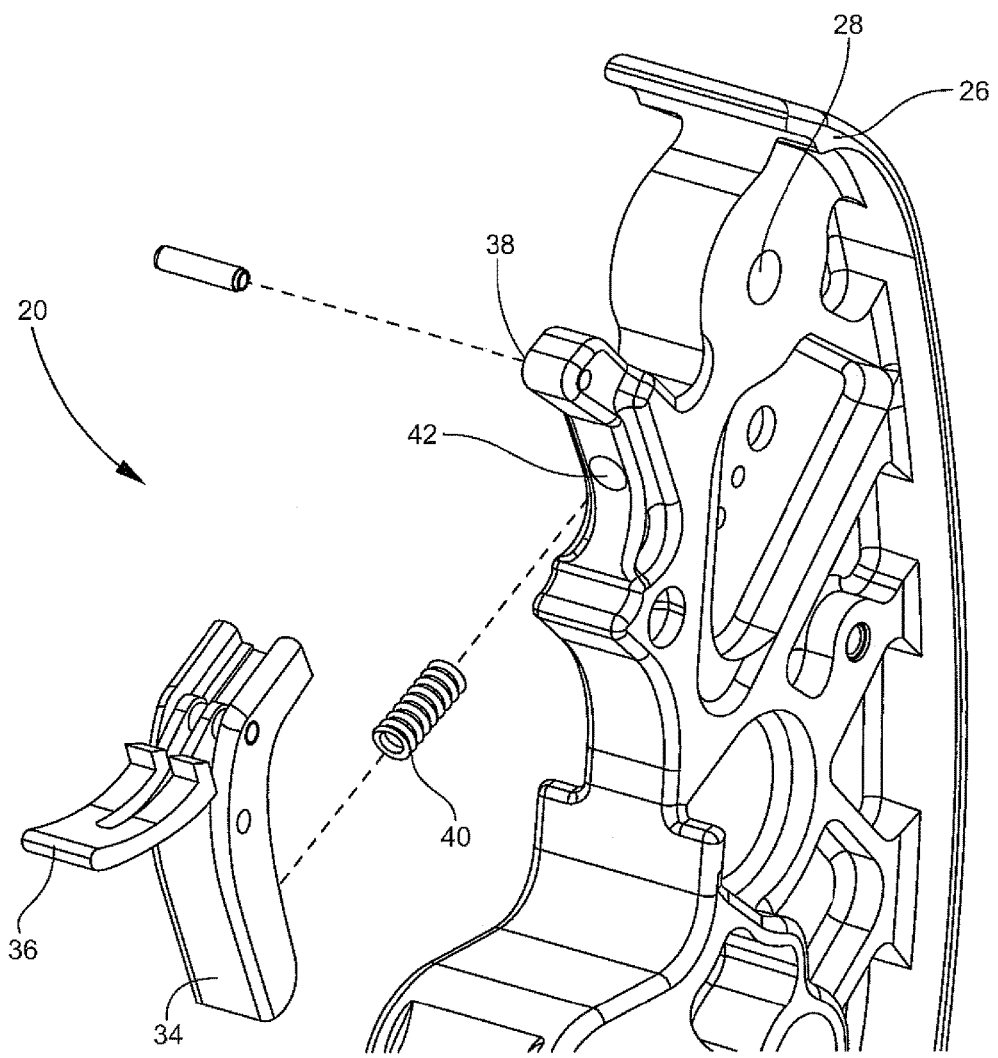
FIG. 2 is an exploded view showing attachment of the armrest pivot guard of FIG. 1 to the static frame member.

Referring to FIG. 2, the armrest pivot guard 20 prevents intrusion in a dynamic manner in which the motion of the articulating pivot guard 20 is driven by armrest travel. In the first embodiment, the armrest pivot guard 20 is a multi-component assembly where one component pivots relative to the other to provide full intrusion protection in all positions of the armrest. The armrest pivot guard 20 includes a first component 34 and a second component 36. The first component 34 pivotally attaches to the static frame member 26 at pivot point 38 which is spaced apart from pivot point 28. In one embodiment pivot point 38 can be positioned generally forward of pivot point 28. The second component 36 pivotally attaches to the first component 34 such that second component 36 can pivot relative to first component 34 and the first component 34 can pivot relative to the static frame member 26. In this arrangement, an articulating, i.e., connected while allowing motion between the components, pivot guard moves with the armrest 24 to occupy the open space.

Relative motion of the first and second components 34, 36 can be driven by a biasing member 40, for example a spring, disposed between the first component 34 and a spring seat 42 of the static frame member 26. The biasing member 40, or in an alternative embodiment multiple biasing members, controls the position and motion of the first and second components 34, 36 by way of spring forces, and the spring locating features of the first and second components 34, 36 provide a positive stop to ensure component positioning.

The first and second components 34, 36 include locating surfaces and features that allow the required rotation at the hinge point for maximum intrusion protection/prevention, while also providing positive stops for preventing over-rotation. The geometry of the first and second components 34, 36 is such that the open space remains closed until the armrest 24 has nearly completed full travel. The first and second components 34, 36 are attached and shaped such that over travel is prevented therebetween. The armrest pivot guard 20 is located at the underside of the armrest and is contained within the armrest profile so as not to affect the aesthetics of the seat. In the fully raised armrest position shown in FIG. 1, the second component 36 is rotated upward relative to the first component 34. In the fully lowered position of the armrest coinciding with FIG. 2, the second component 36 is lowered relative to the first component 34.

Figure 3:
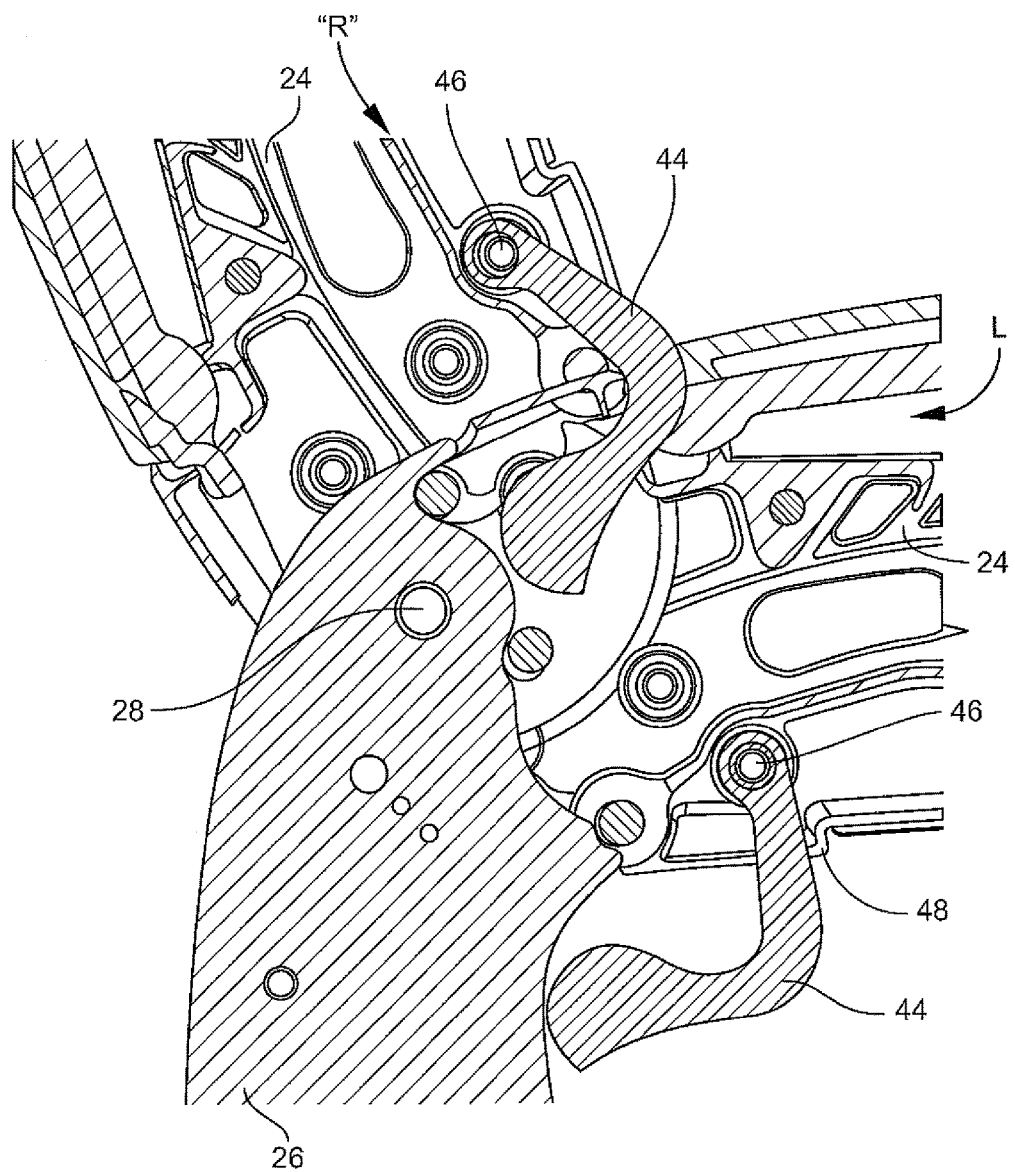
FIG. 3 is a side view of a second embodiment of an armrest pivot guard according to the invention showing both raised and lowered positions of the armrest and respective positions of the armrest pivot guard.

FIG. 3 shows a second embodiment of an armrest pivot guard 44 for preventing unwanted intrusion of articles during armrest articulation. Pivot guard 44 is a one-piece design that can be located to cover a pinch point below the armrest 24. FIG. 3 shows the armrest in a fully raised position indicated at reference letter "R", and a fully lowered position indicated at reference letter "L". The two armrest positions are shown in the same figure for comparative purposes to show armrest pivot guard 44 movement as the armrest moves. The armrest 24 pivotally attaches to the static frame member 26 at pivot point 28. The armrest 24 pivots about pivot point 28 between the fully raised "R" and fully lowered "L" positions.

While armrest pivot guard 20 of the first embodiment is attached to the static frame member 26, armrest pivot guard 44 of the second embodiment is pivotally attached to the armrest 24. Armrest pivot guard 44 is a generally right-angled member having a pivotally attached end and a free end that follows the contour of the static frame member 26 as the armrest moves between vertical and horizontal. The pivot point 46 of the armrest pivot guard 44 is spaced inward from the bottom of the armrest 24 and a recess is provided in the bottom of the armrest 24 for limiting pivoting movement. In the fully lowered position "L", the armrest pivot guard 44 engages an end wall 48 of the recess to prevent over-travel of the armrest pivot guard. The armrest pivot guard 44 occupies what would otherwise be open space that allows the armrest 24 to pivot, but by pivoting itself, does not impede armrest movement.

Figure 4:
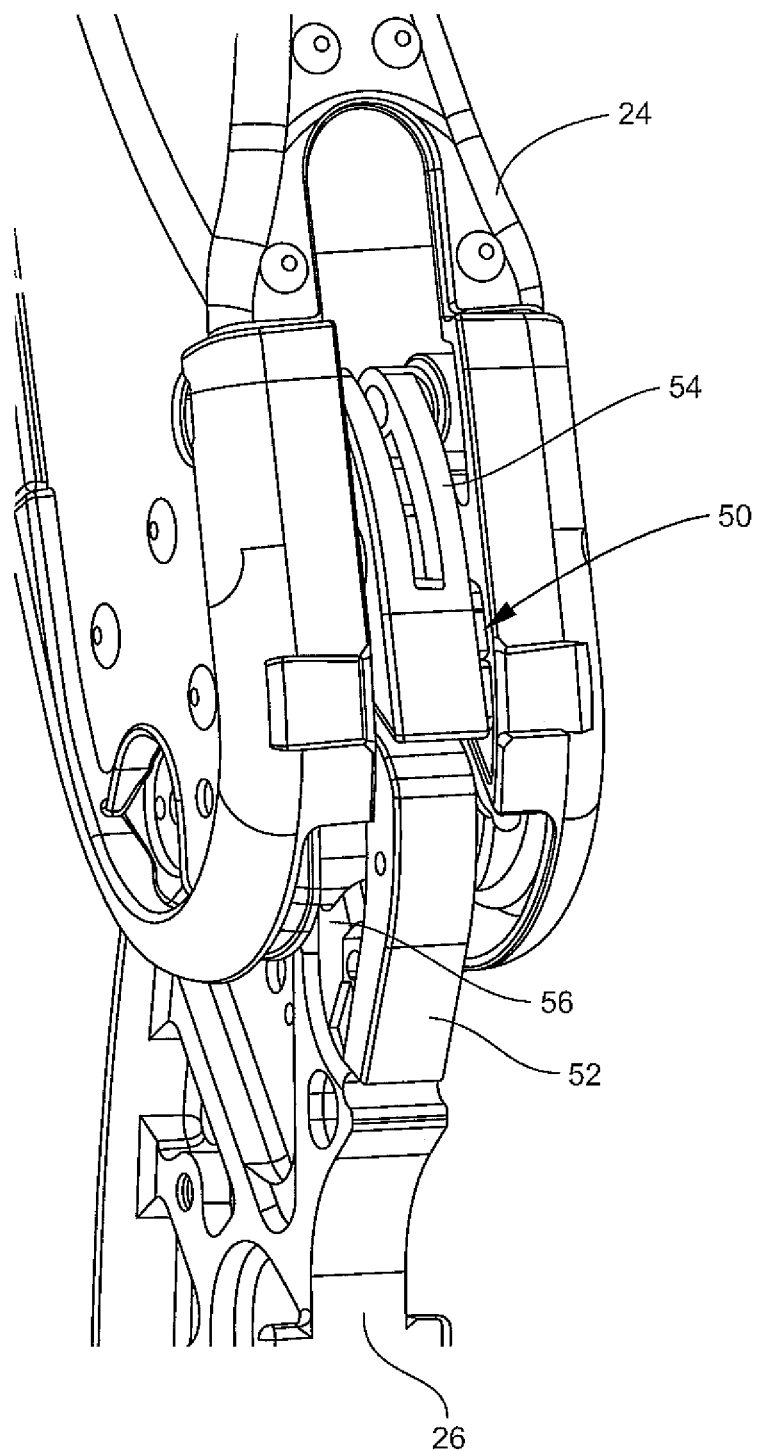
FIG. 4 is a detailed view of the underside of an armrest attachment point to a static frame member illustrating an armrest pivot guard according to a third embodiment of the invention.
Figure 5:
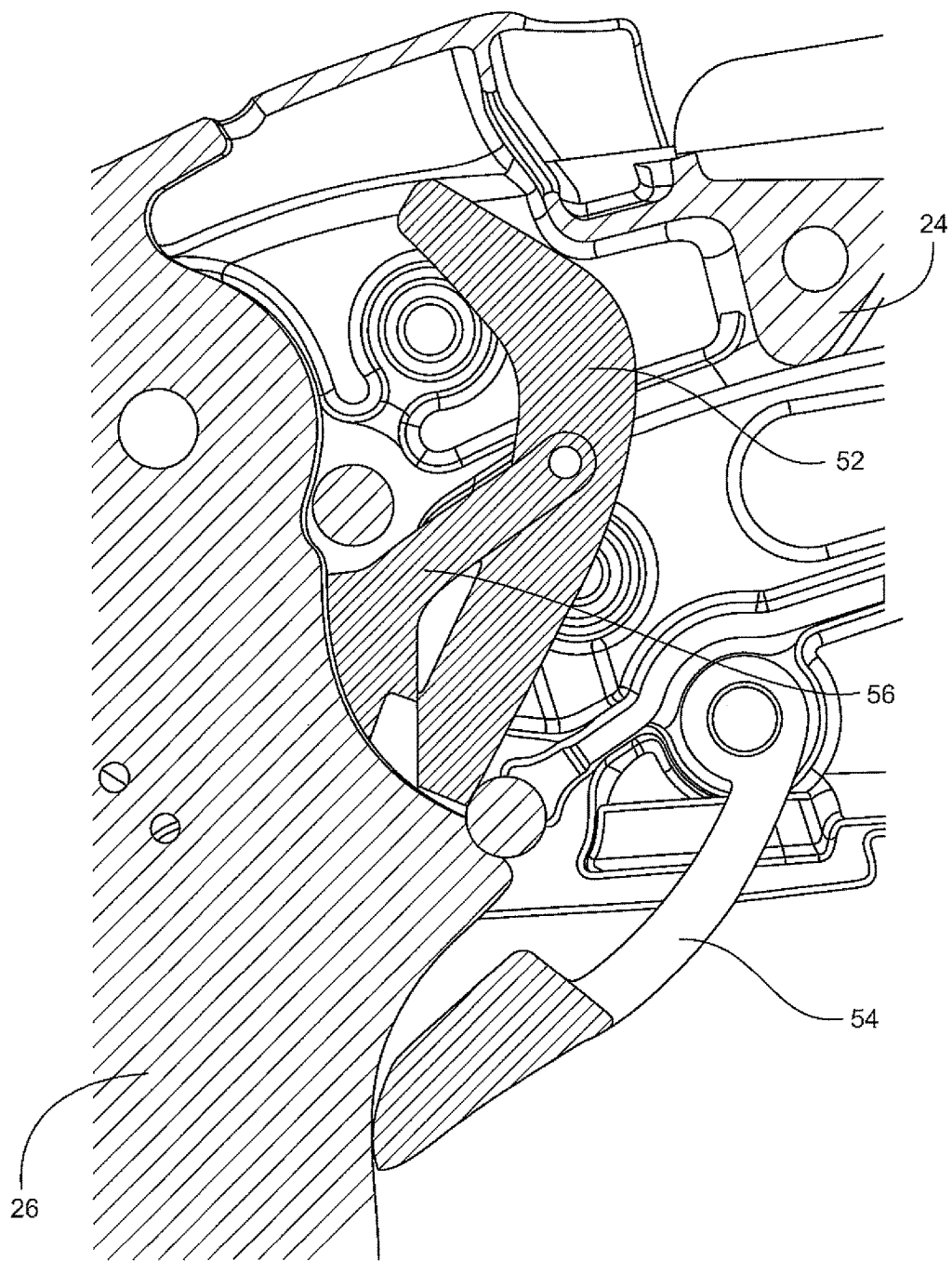
FIG. 5 is a side view of the armrest pivot guard of FIG. 4 showing the armrest in a lowered position.

FIGS. 4 and 5 show a third embodiment of an armrest pivot guard 50 for preventing unwanted intrusion of articles during armrest articulation. In this embodiment, the armrest pivot guard 50 includes separate first and second components 52, 54. The first component 52 is attached to the static frame member 26 and can be spring-biased in a similar manner as the first component 34 of pivot guard 20. The second component 54 is pivotally attached to the armrest 24 in a manner similar to armrest pivot guard 44 such that it moves with the armrest 24. As such, the second component 54 pivots relative to the armrest 24 such that the free end of the second component 54 is able to follow the contour of the front face of the static frame member 26 and the front face of the first component 52 as the armrest pivots from horizontal to vertical, and vice versa. The first component 52 can be attached to the static frame member 26 through a brace 56 which appropriately angles the first component 52 relative to the static frame member 26 and allows the first component 52 to pivot relative to the static frame member 26.

In this arrangement, the second component 54 covers any open space between the attached end of the armrest 24 and the static frame member 26 when the armrest 24 is fully lowered as shown in FIG. 5, and the first component 52 and the second component 54 together align to cover any open space between the attached end of the armrest 24 and the static frame member 26 when the armrest 24 is fully upright as shown in FIG. 4. When the armrest 24 is lowered, the second component 54 slides along/over/passed the outer face of the first component 52 as the armrest 24 nears horizontal, at which time the second component 54 is clear of the first component 52 and continues to slide along the front face of the static frame member 26. The free end of the second component 54 may be biased in the aft direction such that the free end maintains contact with one of the static frame member 26 and the first component 52 at all times to avoid separation of the two and introduction of a potential pinch point.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An armrest assembly, comprising:
    a static frame member associated with a seat;
    an armrest pivotally attached at a first axis at one end of the armrest to the static frame member; and
    an armrest pivot guard pivotally attached at a second axis different from the first axis at one end of the armrest pivot guard to the static frame member, the armrest pivot guard configured to move relative to the static frame member as the armrest pivots relative to the static frame member to maintain coverage of a pinch point near an attachment point of the armrest to the static frame member;
    wherein the armrest pivot guard comprises a first component pivotally attached to the static frame member and a second component pivotally attached to the first component, and wherein the second component moves relative to the first component as the armrest pivots relative to the static frame member.

2. The armrest assembly according to claim 1, wherein motion of the armrest pivot guard is driven by armrest travel.

3. The armrest assembly according to claim 1, further comprising a spring disposed between the first component and the static frame member arranged to bias the first component in a direction away from the fixed frame member.

4. The armrest assembly according to claim 1, wherein an attachment point of the first component to the static frame member is positioned forward of the attachment point of the armrest to the static frame member.

5. The armrest assembly according to claim 1, wherein the second component contacts the first component at a predetermined point along pivoting range of motion of the second component relative to the first component to prevent over-travel of the second component relative to the first component.

6. An armrest assembly for an aircraft passenger seat, comprising:
    a static frame member;
    an armrest pivotally attached at a first axis at one end of the armrest to the static frame member; and
    an armrest pivot guard pivotally attached at a second axis different from the first axis at one end of the armrest pivot guard to the static frame member, the armrest pivot guard configured to move relative to the static frame member as the armrest pivots relative to the static frame member to maintain coverage of a pinch point near an attachment point of the armrest to the static frame member;
    wherein the armrest pivot guard comprises a first component pivotally attached to the static frame member and a second component pivotally attached to the first component, and wherein the second component moves relative to the first component as the armrest pivots relative to the static frame member.

7. The armrest assembly according to claim 6, wherein motion of the armrest pivot guard is driven by armrest travel.

8. The armrest assembly according to claim 6, further comprising a spring disposed between the first component and the static frame member arranged to bias the first component in a direction away from the fixed frame member.

9. The armrest assembly according to claim 6, wherein an attachment point of the first component to the static frame member is positioned forward of the attachment point of the armrest to the static frame member.

10. The armrest assembly according to claim 6, wherein the second component contacts the first component at a predetermined point along pivoting range of motion of the second component relative to the first component to prevent over-travel of the second component relative to the first component.

* * * * *